United States Patent
Wright et al.

(10) Patent No.: US 6,446,275 B1
(45) Date of Patent: *Sep. 10, 2002

(54) SURFACE PROTECTION SYSTEM MAT

(76) Inventors: Rickie J. Wright, 7937 Charrington, Canton, MI (US) 48187; Wade R. Waterman, 103 Hampton Ct., Northville, MI (US) 48167

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,474

(22) Filed: Sep. 11, 1999

(51) Int. Cl.[7] ............................................. E03D 11/00
(52) U.S. Cl. ...................................................... 4/251.1
(58) Field of Search ................................ 4/251.1, 251.2

(56) References Cited

U.S. PATENT DOCUMENTS

| | | | |
|---|---|---|---|
| 4,285,075 A | 8/1981 | Nelson | 4/251.1 |
| 4,328,275 A | 5/1982 | Vargo | 425/156 |
| 4,439,474 A | 3/1984 | Sagel | 428/90 |
| 4,484,661 A | 11/1984 | Evenson | 184/106 |
| 4,609,580 A | 9/1986 | Rockett et al. | 428/198 |
| 4,798,754 A | 1/1989 | Tomek | 428/74 |
| 4,822,669 A | 4/1989 | Roga | 428/287 |
| 4,826,030 A | 5/1989 | Valley | 220/1 |
| 5,028,468 A | 7/1991 | Taylor | 428/71 |
| 5,080,956 A | 1/1992 | Smith | 428/166 |
| 5,114,774 A | 5/1992 | Maxim, Jr. | 428/101 |
| 5,128,189 A | 7/1992 | Bartlett | 428/71 |
| 5,270,089 A | 12/1993 | Alston et al. | 428/60 |
| 5,383,570 A | 1/1995 | Gordon | 221/213 |
| 5,506,040 A | 4/1996 | Cordani | 428/218 |
| 5,549,945 A | 8/1996 | Lind | 428/35.5 |
| 5,613,332 A | 3/1997 | Saylor, Jr. | 52/177 |
| 5,916,658 A | 6/1999 | Mohr | 428/81 |

Primary Examiner—Robert M. Fetsuga
(74) Attorney, Agent, or Firm—Kohn & Associates

(57) ABSTRACT

A surface protection system consisting of three pieces, (1) cartridge-top, (2) absorbent core, and (3) base unit. The cartridge-top, made of semi-flexible material with a waffle grid design of drainage holes, traps and directs liquid spills into the absorbent core. The core is a thin layer of material attached to the entire underside of the cartridge-top, forming one unit. The core material, consisting of cotton-fluff and a super-absorbent polymer or fiber, holds and wicks the liquid away from the surface, turning it into a jell. The cartridge-top is snapped onto the top of the base unit covering it completely. It is disposed via routine trash collection during maintenance (usually weekly) and replaced by a fresh one. The base unit is also made of semi-flexible material and is extremely durable. It is placed on the floor under a urinal and secured to the floor to prevent its accidental displacement.

8 Claims, 8 Drawing Sheets

SURFACE PROTECTION SYSTEM MAT

CROSS-REFERENCE TO RELATED APPLICATIONS

Figure 1:
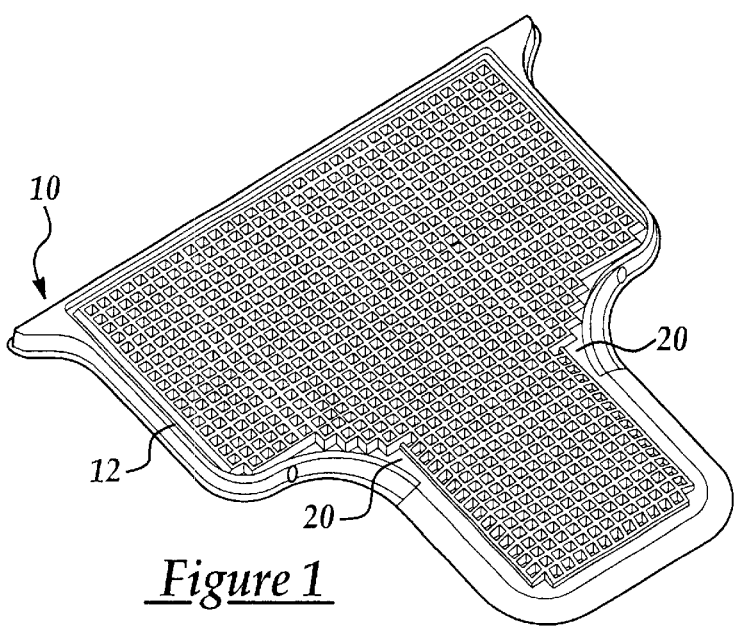

Not Applicable.

BACKGROUND—FIELD OF INVENTION

This invention relates to protecting surfaces, specifically floors and countertops exposed to damaging liquids. In the case of floors, it also addresses prevention of slips and falls.

BACKGROUND—DESCRIPTION OF PRIOR ART

Floors and countertops are subject to accidental liquid spills, and in the case of floors, potentially causing slip and fall hazards. Also, the liquid from the spills often damages the surface causing costly repairs. To preserve a dry condition, these floors and countertops require constant maintenance.

Normally, scheduled maintenance is used to monitor and clean up accidental spills. These spills occur frequently and often go unnoticed for long periods of time. Currently, excessive maintenance schedules attempt to solve the problem. However, damage to the surface still occurs between maintenance.

U.S. Pat. No. 4,285,075 (SANITARY COMMODE MAT), issued to Ann J. Nelson on Aug. 25, 1981, provided a two piece unit for protecting floors from urine. This device has a solid base and a hingedly attached cover formed as grille work. This cover is treated with silicone compounds to repel fluids. A replaceable pad is contained in the mat cover. The pad has an impervious plastic film base, layers of absorbent material overlaying the base, and a top previous film of non-woven material. In use, the urine falling on the grille work passes through, on and through the permeable top film of the pad, and absorbed therein. The absorbent pad may be impregnated with disinfectant and deodorizing chemicals. Maintenance is performed by opening the hinged cover, removing the pad for disposal, rinsing the base and hinged cover grille work, and installing a fresh pad.

This product has a single purpose—keeping urine off restroom floors. No other uses are claimed or presented as additional embodiments.

U.S. Pat. No. 4,609,580, issued to Luann T. Rochett, employed a surface mat of continuous filament, non-woven nylon to protect floors during inclement weather. The mat contained an absorbent inner layer comprised of a mixture of polymeric micro-fibers and wood pulp, and a liquid impervious film backing layer. This invention has no application under urinals. Additionally, the entire mat must be disposed during maintenance. This patent was discontinued eight years after issuance.

U.S. Pat. No. 4,328,275, issued to Louis M. Vargo, is a disposable floor mat for bathrooms, hospital operating rooms, etc. used for absorbing liquid spills. The mat is designed to support a person, or persons, standing on it while it is being used. The stated uses include absorbing water, urine and other liquids found in bathrooms, etc. It is constructed of a sheet of liquid absorbent matting with raised portions of v-shaped or rounded cone tops coated with a repellent to direct and divert the liquid into the mat. A sanitizing agent must be impregnated into this matting to avoid cross-contamination. The liquid is retained in this absorbent matting. Ridges are built into the bottom of the mat to prevent contact with the contaminating liquid. Maintenance is accomplished by disposing the entire mat. This invention does not separate the liquid spills from the surface with a wicking or absorbing agent. Contaminated liquid (such as urine or blood) will remain on the tops of the v-shaped or rounded cones surfaces, causing cross-contamination and a slipping hazard. Excess liquid will flow in the valleys of the invention and on to the floor surface during maintenance. The height of this invention creates a tripping hazard.

U.S. Pat. No. 5,114,774, issued to Henry A. Maxim, Jr., is all absorbent floor mat for use in wet and oily environments. This mat has a base unit with self-gripping fastener, and an absorbent top unit (upper surface). It is designed to reduce incidents of pedestrians slipping or sliding on wet or oily surfaces. This removable absorbent unit is constructed of fiber material such as indoor-outdoor carpeting. An additional preferred embodiment provides for drainage between the absorbent unit and the base unit allowing liquid or oil to drain into the base unit, rather than lying on top. No provision is made for use under urinals or around commodes. Liquid spills or drips remain on the surface exposed to pedestrian cross-contamination and slipping hazards. Maintenance is accomplished by removing the absorbent unit and hand-washing in cold water. After washing, the unit is dried by drip-drying or wringing. Dry cleaning is also an option. This puts the contaminated material in direct contact with the hands of maintenance personnel. Chemicals, oil, and similar spills cannot be disposed by washing down into a sanitary drain. The absorbent core material does not retain the spill effectively, nor does it remove it from the surface by wicking or absorbing means, it remains on the surface. Maintenance is required after every spill. This patent expired four years after issue.

U.S. Pat. No. 4,822,669, issued to Robert C. Roga, is a floor protection system consisting of three separate pieces combined to form a single unit. The top layer is of nonwoven fiber, with a water impervious film, laminated to the underside. An absorbent paper layer, interposed between these two materials, is a second embodiment. This invention is not designed for urinals. The entire mat must be disposed and replaced. No method of cleaning or replacing the absorbent portion is indicated. The stated purpose of the top layer is to remove and retain soils. The stated purpose of the middle layer (second embodiment) is to absorb both water and oil based liquids, preventing them from subsequent contact with the top surface during use. This system fails to provide a maintenance method other than complete disposal, greatly increasing cost of controlling accidental spills. Use involves standing and/or walking in polluted fluids producing cross-contamination. This patent expired eight years after issue.

U.S. Pat. No. 4,826,030, issued to Charles R. Valley, does not address floors.

U.S. Pat. No. 4,798,754, issued to Lawrence S. Tomek, is an oil-absorbent floor mat designed for placement beneath a motor vehicle or machine to catch oil, grease, and other drippings. It is not intended for bathrooms or other uses.

U.S. Pat. No. 5,028,468, issued to Alfred R. Taylor, is a surgical mat with disposable cover designed for use in a hospital operating room. This patent expired four years after issue.

U.S. Pat. No. 4,439,474, issued to Paul J. Sagel, is an absorbent, disposable floor mat for entrance-ways.

U.S. Pat. No. 5,128,189, issued to David H. Barlett, is a disposable mat operating rooms or chemistry labs and entrance-ways.

U.S. Pat. No. 5,270,089, issued to Timothy E. Alston, is a fluid absorbing system for recovering waste fluids from defined areas.

U.S. Pat. No. 5,383,570, issued to Terry Gordon, is a floor mat dispensing apparatus. However, no disposable floor mat is claimed.

U.S. Pat. No. 4,484,661, issued to John L. Evenson, is a drip pan for vehicles, designed to catch drippings from parked automobiles or trucks.

U.S. Pat. No. 5,549,945, issued to Bruce B. Lind, is an absorbent mat for oil and other liquid drippings beneath a motor vehicle.

U.S. Pat. No. 5,506,040, issued to Peter J. Cordani, is a fluid absorption mat designed for placement beneath fluid leaking machinery.

U.S. Pat. No. 5,080,956, issued to Linda K. B. Smith, is an oil absorbent mat with spill channeling means designed to surround the base of leaky machinery to inhibit the flow of oil-based liquids.

U.S. Pat. No. 5,613,332, issued to Edward T. Saylor, Jr. is a slip resistant floor mat intended for foot traffic across wet floor surfaces.

U.S. Pat. No. 5,916,658, issued to Ronald G. Mohr, is a mat designed to collect fluids and other debris falling from a vehicle.

U.S. Pat. No. 4,497,147, issued to David D. Clapper, is a mat for garage floors and the like, designed to capture oil drippings from beneath a motor vehicle.

Patent application invention pending by Matthew G. Jenkins, employs a base mat to contain spills. It includes an insert to direct liquid to an absorbent pad located at the back of the mat. This system requires a flat surface to operate effectively. Most surfaces are not flat, but slope to a drain. The design of this product does not take this into consideration and the liquid often does not reach the absorbent pad. Additionally, liquids vary in viscosity and surface tension requiring more than gravity for proper flow to the absorbent pad.

SUMMARY

In accordance with the present invention, it has multiple uses, including restroomns, residential, and office applications, and commercial entrances. The used absorbent core containing liquid (i.e. urine, etc.) is not seen or touched during maintenance. This core is mated to the underside of a cartridge-top and both are tossed in the trash with no special treatment needed. The invention does not depend on hinges to remain closed and operational. The base unit of the invention is fastened to the surface to deter accidental movement. Occasional base unit maintenance involves simple unfastening and removal from the surface and cleaning with bleach or other disinfectant and refastening to the surface.

OBJECTS AND ADVANTAGES

Accordingly, several Objects and Advantages of the present invention are:

(a) The cartridge-top with its mated absorbent core is easily disposed
(b) The soiled absorbent core is not seen or touched during maintenance
(c) The used cartridge-top requires no cleaning or rinsing
(d) The waffle grid design of the cartridge-top needs no environmental polluting silicone treatment to aid liquid flow to the absorbent core
(e) The front section of the cartridge-top is beveled reducing trip and fall hazards from shoes catching on the top
(f) The base unit requires only occasional maintenance when cartridge-top is changed on schedule
(g) Cross-contamination is reduce, due to disposal of cartridge-top instead of cleaning it

DRAWING FIGURES

In the drawings, closely related figures have the same number but different alphabetic suffixes:

FIG. 1. shows cartridge-top.

Figure 1A:
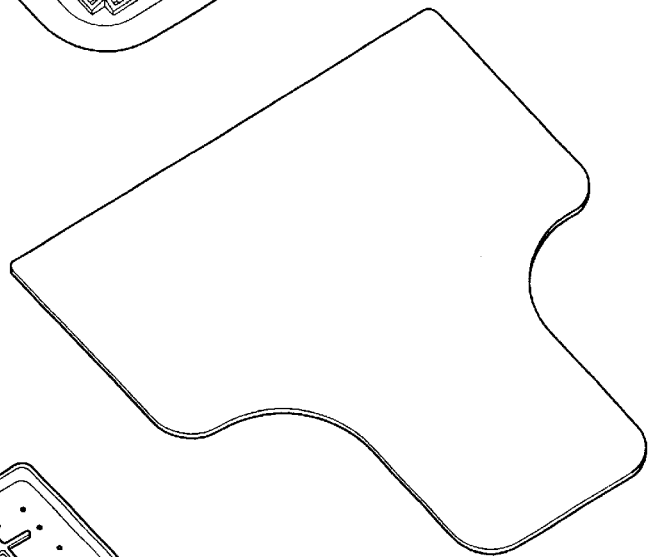

FIG. 1A shows absorbent core.

Figure 2:
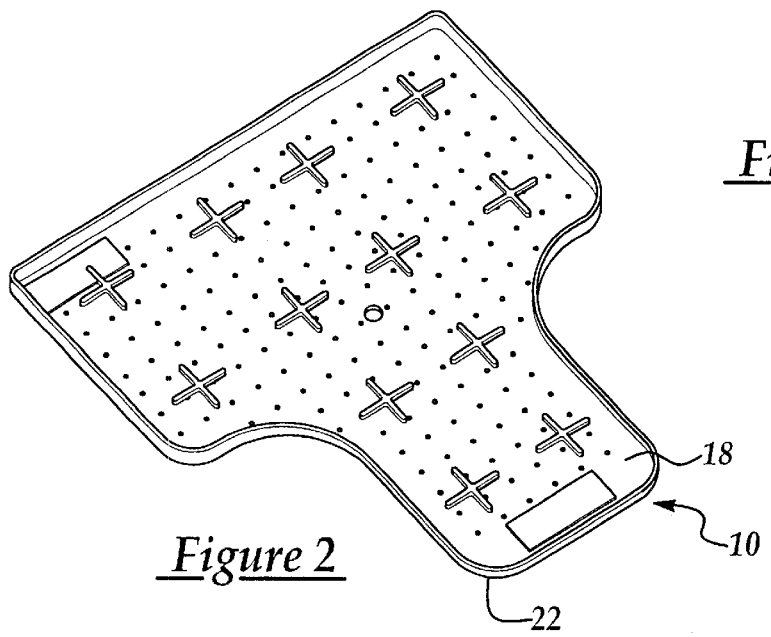

FIG. 2. shows base unit.

Figure 3:
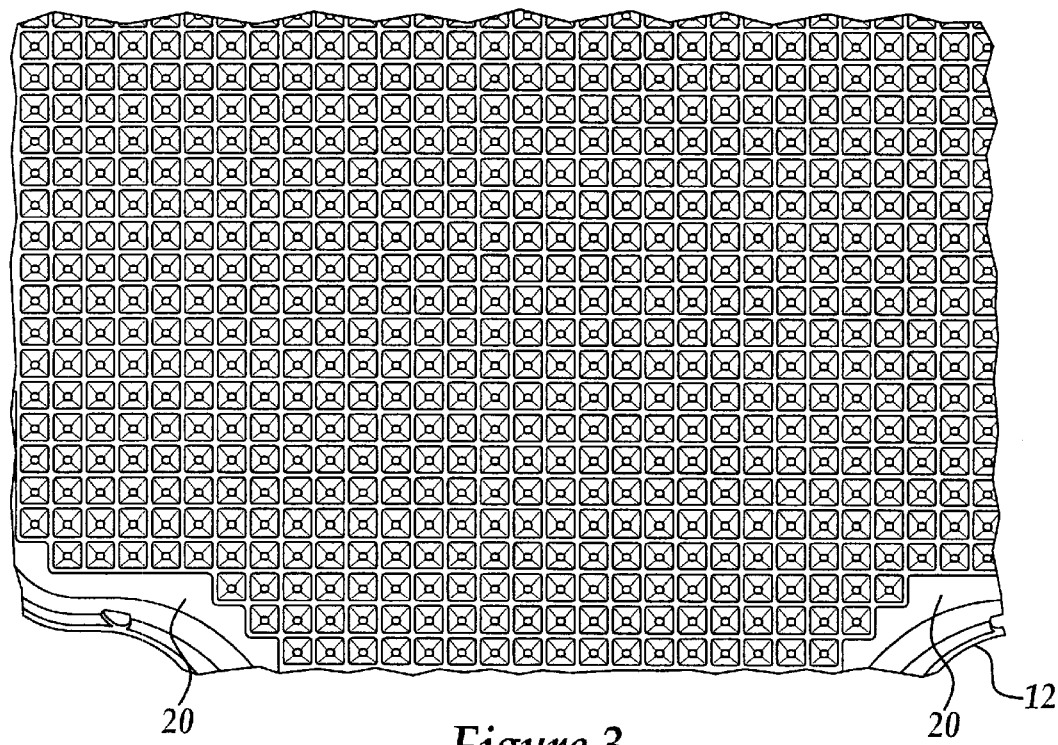

FIG. 3. shows a section of the cartridge-top waffle grid.

Figure 4:
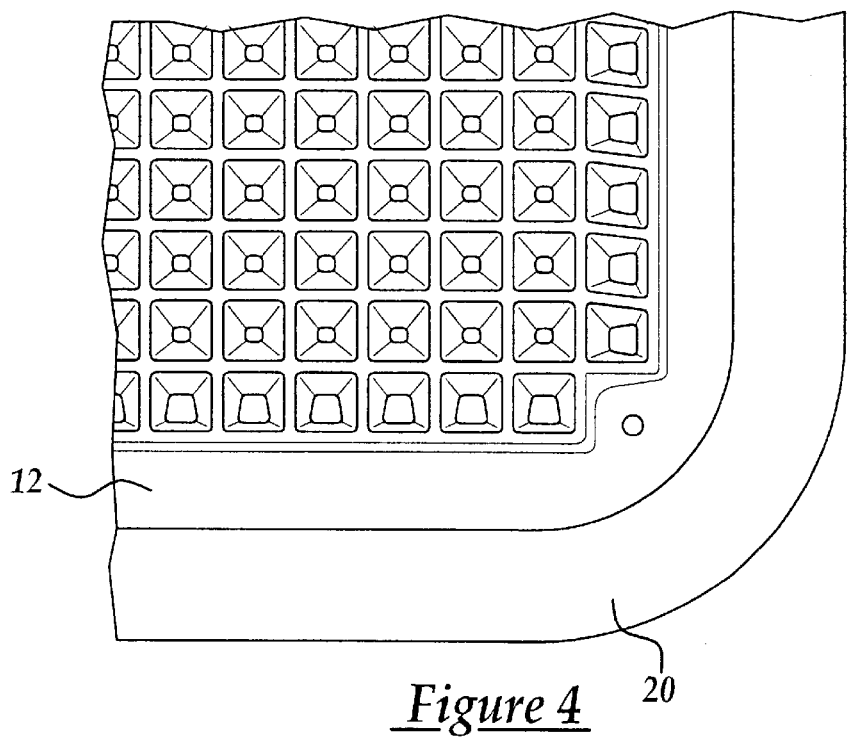

FIG. 4. Shows drain holes in the cartridge-top waffle grid.

Figure 5:
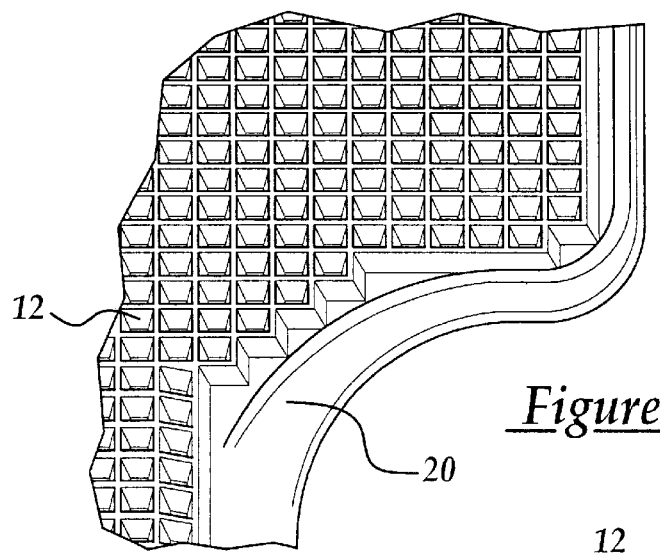

FIG. 5. shows tab used in removing the cartridge-top from the base unit.

Figure 6:
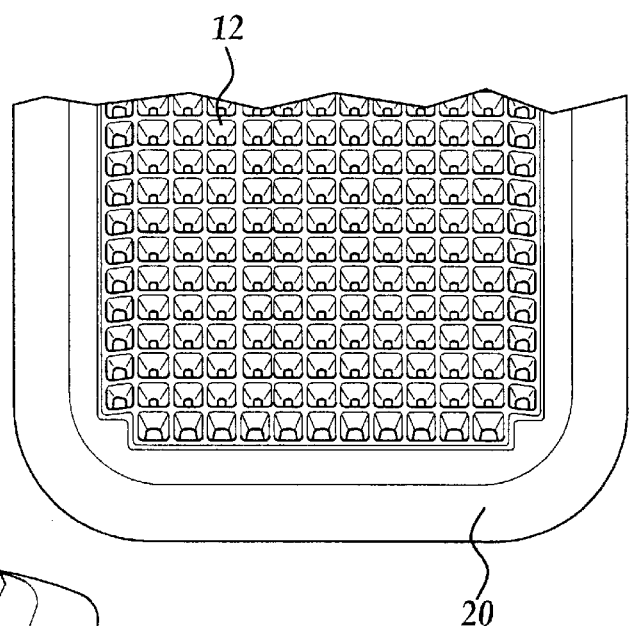

FIG. 6. shows drain holes around the edge of the cartridge-top, outside of the waffle grid area.

Figure 7:
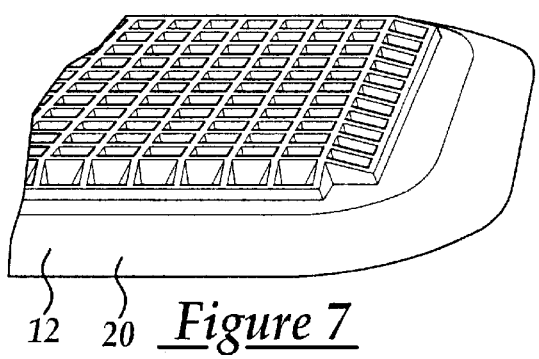

FIG. 7. shows trip-resistant beveled front edge of the cartridge-top.

Figure 8:
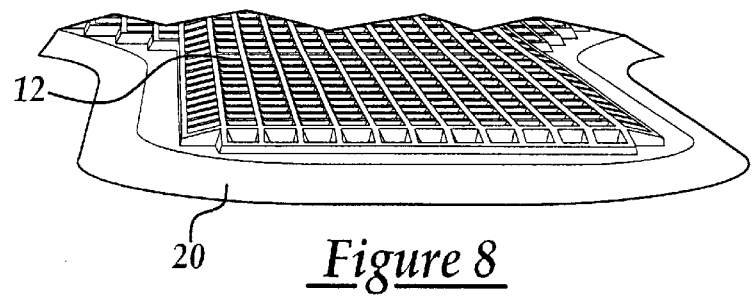

FIG. 8. shows another view of the cartridge-top beveled edge.

Figure 9:
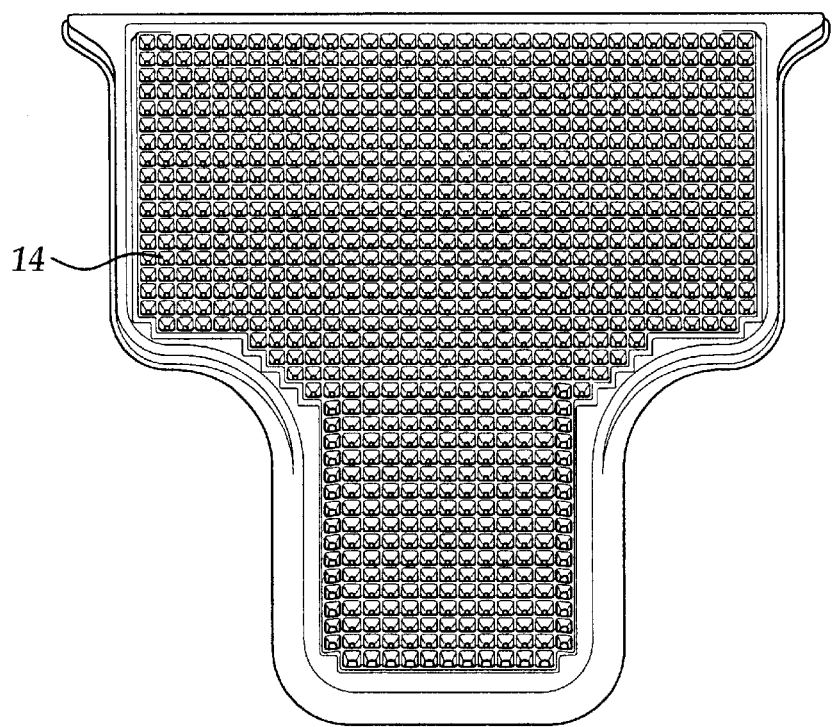

FIG. 9. shows absorbent core fixed to the cartridge-top (shown upside-down).

Figure 10:
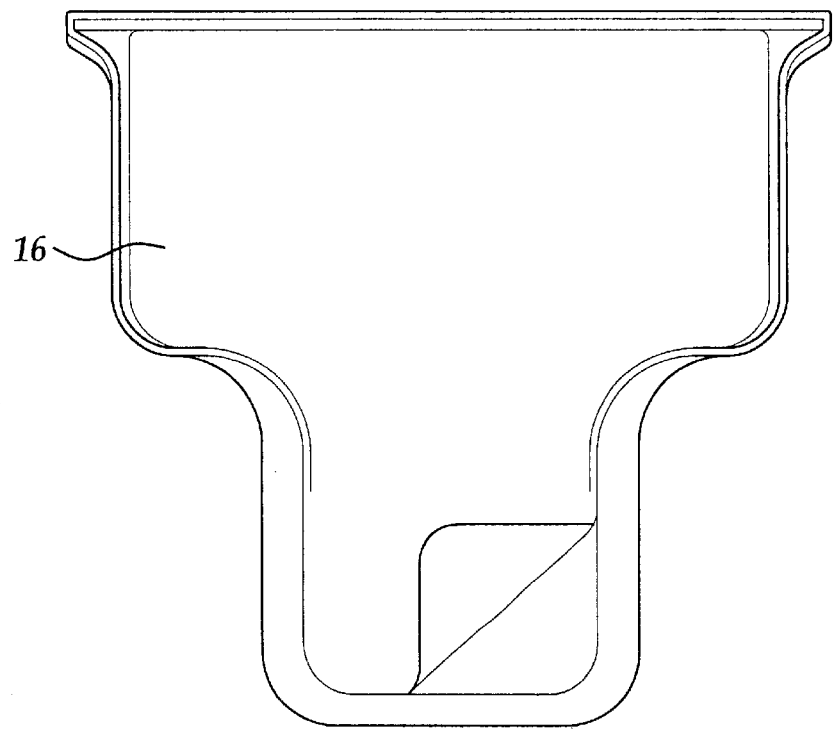

FIG. 10. shows the backing of the absorbent core consisting of a sheet manufactured from polyprophene, vinyl, nylon or similar materials.

Figure 11:
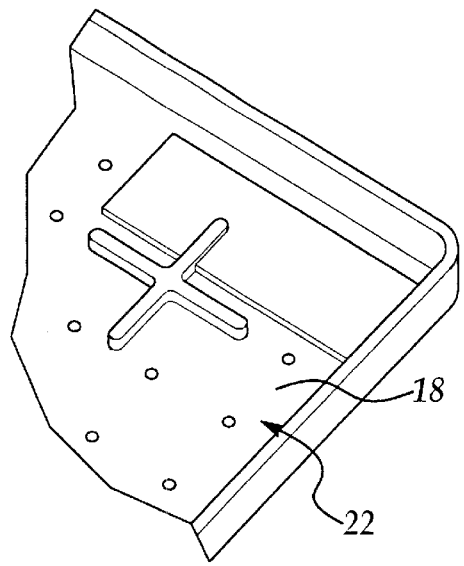

FIG. 11. shows top view of the base unit fastener area.

Figure 12:
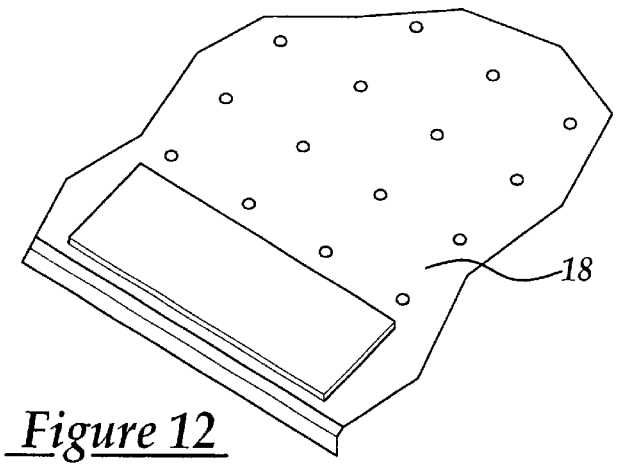

FIG. 12. shows base unit reverse-side (under-side) with view of skid-resistant contact points.

Figure 13:
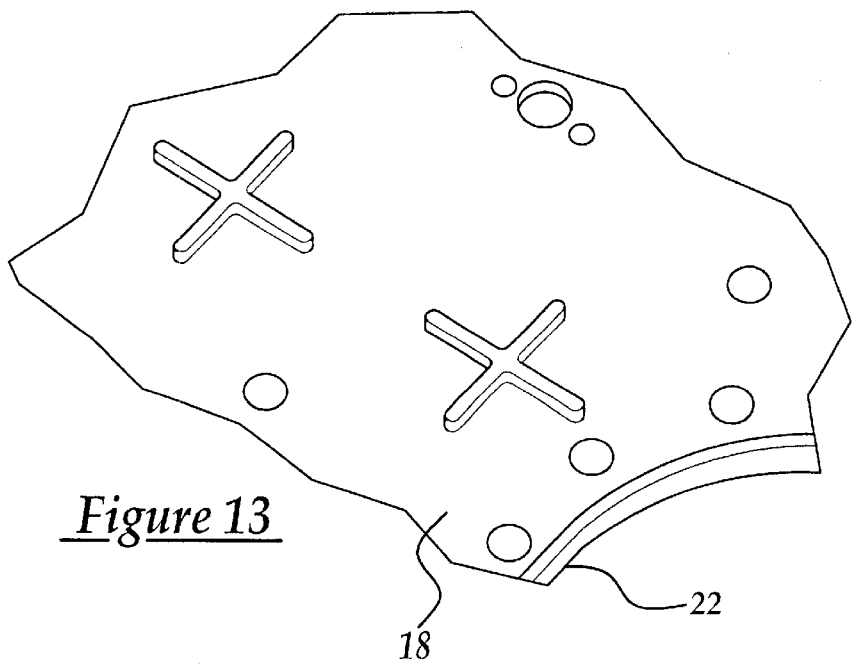

FIG. 13. shows absorbent core supports in the base unit.

Figure 14:
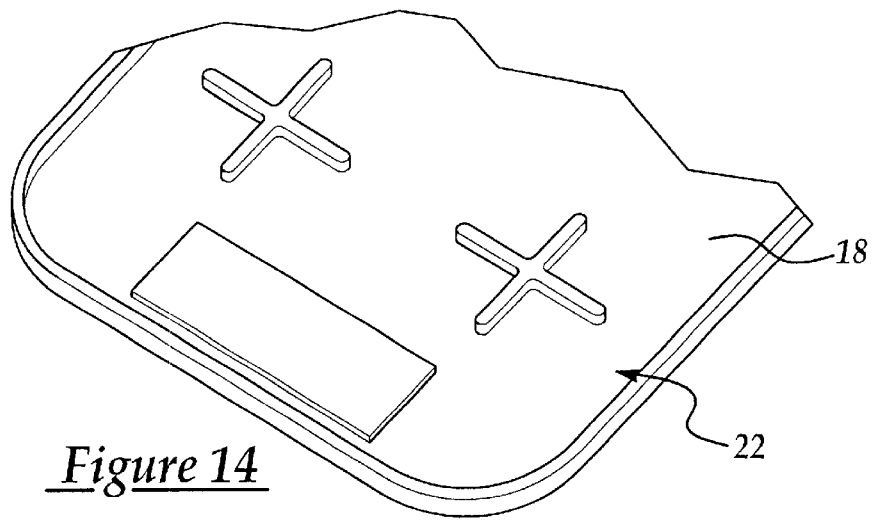
Figure 15:
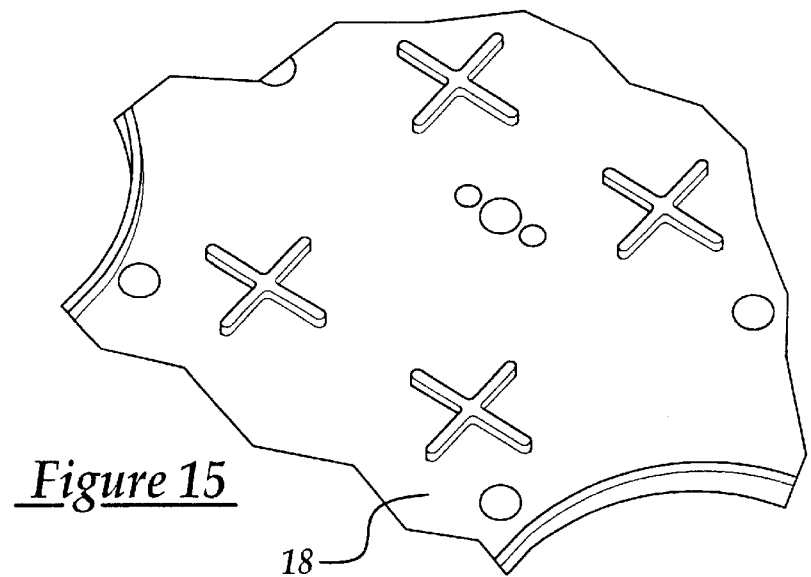

FIG. 14. shows wording "LIFT HERE" for use in removing and cleaning the base unit FIG. 15. shows wording "CAUTION DO NOT USE WITHOUT CARTRIDGE" notice on base unit.

Figure 16:
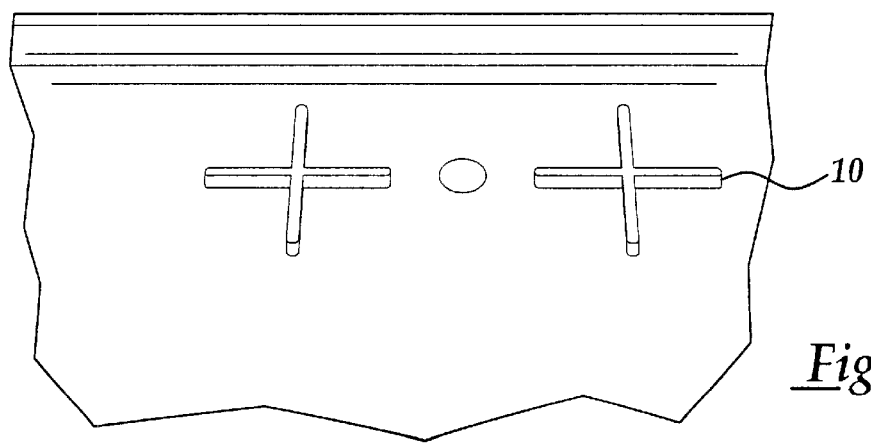

FIG. 16. shows wording "PLACE ¼ INCH FROM WALL" notice with two arrows on base unit.

Figure 17:
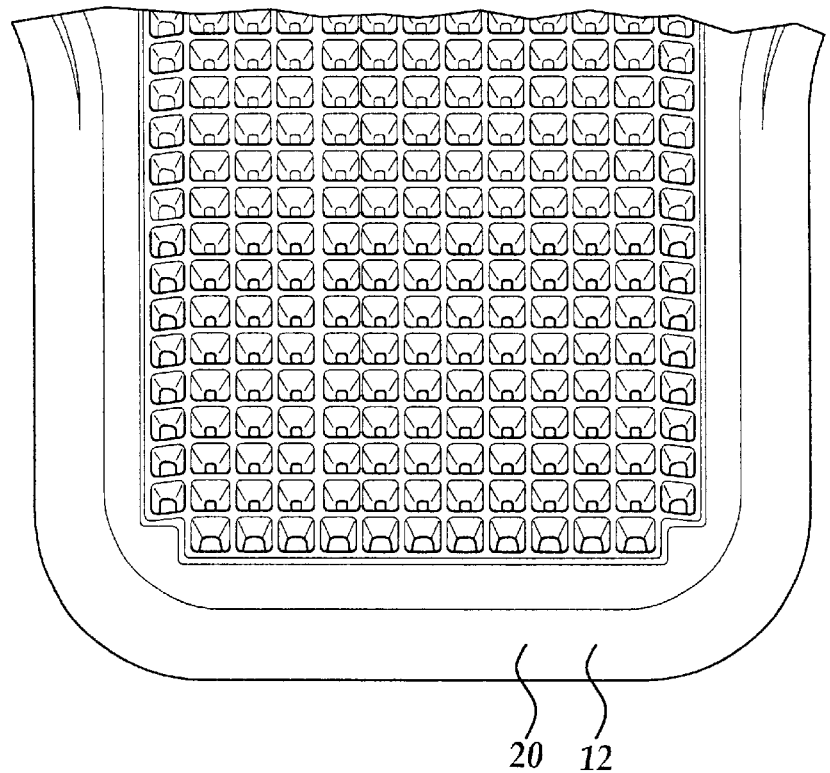

FIG. 17. shows "DRY DOGS" logo on the cartridge-top.

Figure 18:
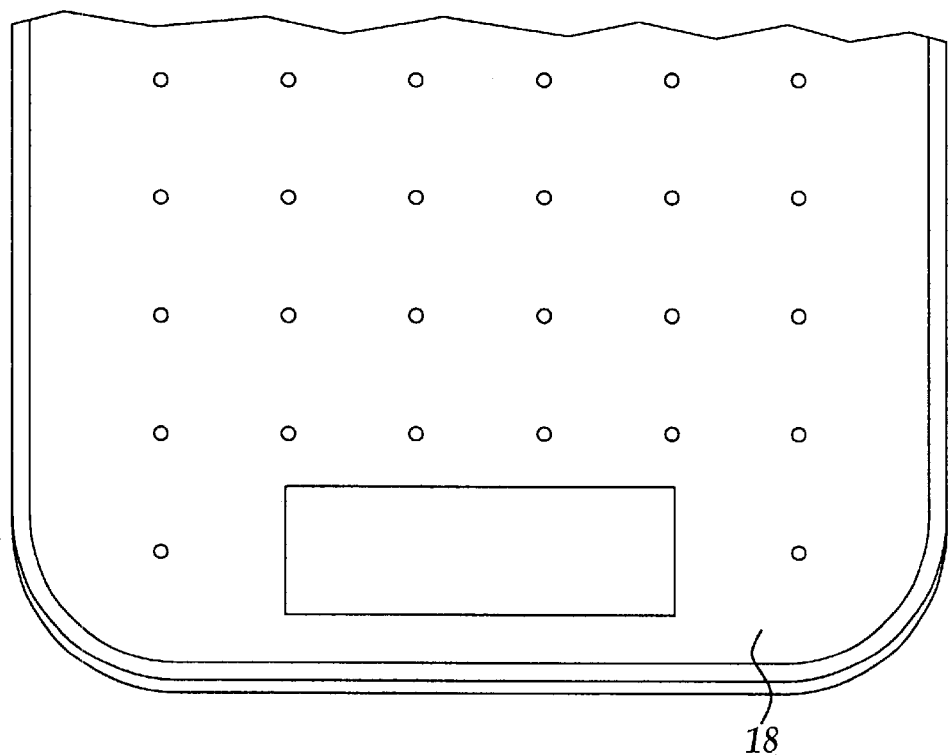

FIG. 18. shows reverse-side (under-side) of base unit fastener area.

Figure 19A:
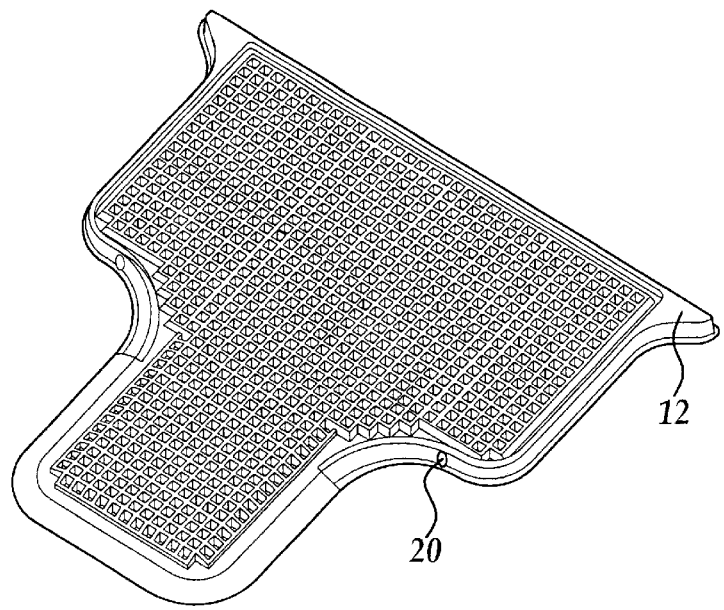
Figure 19B:
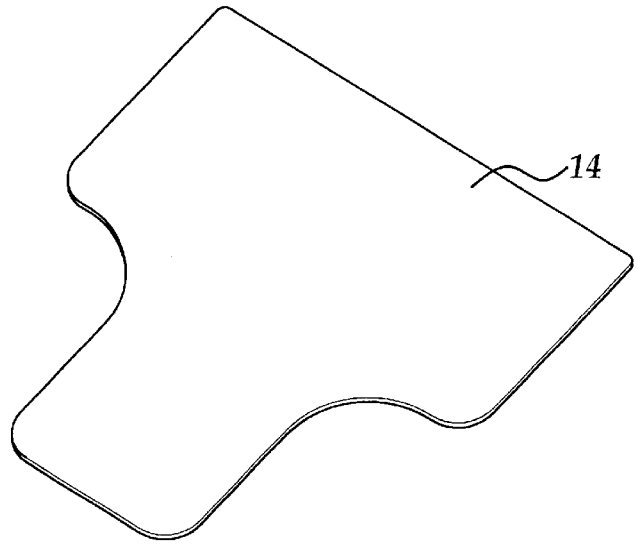
Figure 19C:
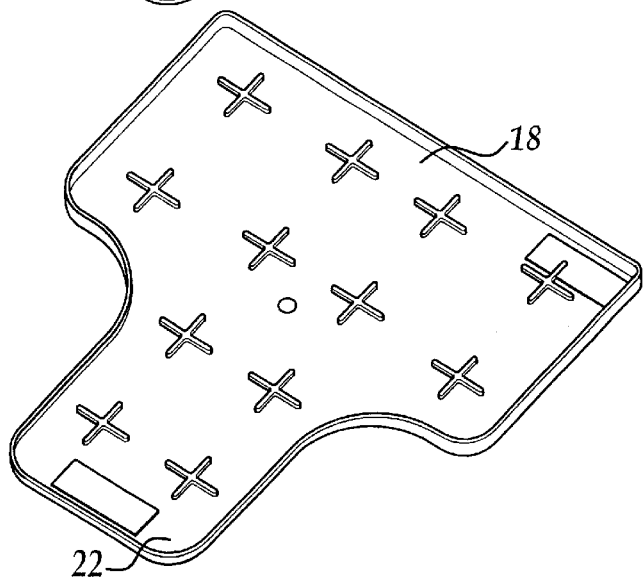

FIG. 19(A) shows a cartridge top. FIG. 19(B) shows the mated absorbent core and FIG. 19(C) shows the base unit.

DESCRIPTION—FIGS. 1, 1A and 2

A preferred embodiment of the invention is illustrated in FIGS. 1, 1A and 2 (top views). The invention is used under a wall-mounted urinal in men's restrooms. The cartridge-top 12 (FIG. 1) is made of polypropylene, polyethylene, vinyl, nylon, rubber or any other material that can be molded or injection-molded in this fashion.

The dimensions and configurations of the cartridge-top-12 are:

1. The thickness is typically 0.5 mm to 1.5 mm and has overall dimensions of roughly 52 cm (square shaped).
2. In the preferred embodiment, the front dimension is narrowed to approximately 22 mm×24 mm providing more comfortable standing room.
3. The front has also been beveled, or sloped, and rounded to minimize tripping and/or snagging and potential personal injury.

The base unit is secured to a surface with various types of fasteners including VELCRO™ or hoop and Loop devices.

In the preferred embodiment, a Hoop and Loop device from 3M Corp. will be used. The base unit is typically 0.5 mm to 3.0 mm thick with 75 to 95 durameter providing flexibility for various sloping surfaces.

The absorbent core (FIG. 1A) is manufactured from super-absorbent material 14 such as polymer or fiber in a percentage to cotton-fluff depending upon the embodiment. In the preferred embodiment, the Super-absorbent material 14 is in a ten-percent proportion to the cotton-fluff. The core is sealed with a moisture barrier 16 (FIG. 10) to prevent leakage of the liquid into the base unit 18. It is sonic-welded to the cartridge-top 12, fixed with adhesives, or attached in some similar fashion.

The base unit 18 is secured to a surface with various types of fasteners including Velcro or Hoop and Loop devices. In the preferred embodiment, a Hoop and Loop device from 3M Corporation will be used. The base unit 18 is typically 0.5 mm to 3.0 mm thick with 75 to 95 durameter providing flexibility for various sloping surfaces.

ADDITIONAL EMBODIMENTS

Additional embodiments include the use for wall-mounted toilets. This embodiment is a longer system for the additional length required. Another embodiment is for use with floor-mounted toilets with an appropriate cutout. A further embodiment for residential or office use includes dimensions of approximately 55 cm by 40 cm. It protects floors from wet boots and shoos. A similar embodiment, but larger in size, is used in entrances to commercial buildings. In this embodiment, several separate floor protection units 10 are joined together to provide a larger area of surface protection. A variety of methods to connect the units 10 can be employed. Finally, of a smaller size can be used on countertops and liquid vending machines. The size would approximate 30 cm×10 cm to 80 cm×30 cm.

ALTERNATIVE EMBODIMENT

There are various possibilities with regard to the design of the cartridge-top 12 waffle grid (FIG. 3). The shape can be that of any geometric design that provides an opening at the top with a smaller outlet at the bottom. Any polygon or conical configuration allowing liquid to flow into the absorbent core 14 (FIG. 1A) with a minimum of splashing may be used.

ADVANTAGES

From the description above, a number of advantages with this invention in the preferred embodiment are evident:

(a) Restroom floors are dryer with urine drips and splashes contained inside the cartridge-top's 12 absorbent core 14.

(b) Maintenance is greatly deceased because the cartridge-top 12 is disposable, requiring no cleaning or rinsing.

(c) Cross-contamination is virtually eliminated because shoes need not touch the cartridge-top 12.

(d) Tripping hazard is minimized by the beveled front edge of the cartridge-top 12.

In the additional embodiments, the following advantages are apparent:

(a) Application includes floor and wall-mounted toilets and urinals.

(b) Residential and office use protects floors from wet footwear.

Commercial businesses can minimize slip and fall hazards in wet weather.

(c) Surface protection can be given to vending machines which dispense liquids (hot or cold).

OPERATION

The manner of using the floor protection system is to place the base unit 18 under a urinal. It is secured to the floor with the fastener provided. The cartridge-top 12 (containing the mated absorbent core) is snapped into the top of the base unit 18. In the preferred embodiment, the cartridge-top 12 is changed on a scheduled basis, usually weekly.

In the additional embodiments, the absorbent core 14 will container higher amounts of polymers or fibers. The suggested change cycle is thirty days. If necessary, more frequent changes may be made. For each of the additional embodiments, the operation is the same. The base unit 18 is placed in a desired spot and fastened to the surface. The cartridge-top 12 is positioned on top of the base unit 18 and snapped into place.

CONCLUSION, RAMIFICATION, AND SCOPE

Accordingly, the reader will see that while its main focus is on floor protection, the invention addresses countertop and other surfaces as well.

When used in the floor protection embodiment, the base unit-18, secured to the floor, cannot be easily dislodged. This provides more consistent protection. Maintenance is simplified by disposing both the cartridge-top 12 and the mated absorbent core during routine trash collection. No cleaning or rinsing of the cartridge-top 12 is required. Costly maintenance time is also reduced.

Users do not stand on the floor protection system 10, minimizing cross-contamination from shoes. Additionally, the beveled front edge of the cartridge-top 12 reduces trip and fall hazards. In other applications, the invention provides liquid protection to carpeted or wood floors and countertops in residents and offices.

Although the description above contains many specifics, these should not be construed as limiting the scope of the invention. It merely provides illustrations of some of the presently preferred and additional embodiments. For example, the invention can have other shapes (i.e. circular, oval, trapezoidal, triangular, etc.). The cartridge-top's 12 waffle grid can also have other shapes and designs. The cartridge-top 12 could even be separate from the absorbent Gore, allowing changing of the core only, etc.

Thus, the scope of the invention should be determined by the appended claims and their legal equivalents, rather than by the examples given.

We claim:

1. A urinal or commode mat for protecting a restroom surface from spillage of liquids, said mat comprising:

a cartridge unit including (a) moisture absorbing means for absorbing and retaining liquid, (b) a cartridge top disposed over and connected to said moisture absorbing means for collecting and draining liquid onto said moisture absorbing means, (c) barrier means disposed beneath and connected to said moisture absorbing means for preventing moisture escape from said moisture absorbing means; and a base unit shaped as shown in FIG. 1, engaged with said cartridge unit and containing said cartridge unit.

2. The mat of claim 1, wherein said cartridge top means is made of at least one durable material.

3. The mat of claim 2, wherein said durable material is selected from the group consisting essentially of polypropylene, nylon, plastic, rubber and synthetic material.

4. The mat of claim 1, wherein said moisture absorbance means is made of at least one layer of absorbent material.

5. The mat of claim 3 wherein said absorbent material is selected from the group consisting essentially of wood pulp, fibers, polymers, and combinations thereof.

6. The mat of claim 1, wherein said base unit includes skid-resistant means for the prevention of any movement of said surface protection system.

7. The mat of claim 1, wherein said cartridge top is a single, disposable sealed system.

8. A method of protecting a restroom surface from spillage of urine by placing said mat of claim 1 on the surface in need of protection.

\* \* \* \* \*

UNITED STATES PATENT AND TRADEMARK OFFICE
CERTIFICATE OF CORRECTION

| | |
|---|---|
| PATENT NO. | : 6,446,275 B1 |
| APPLICATION NO. | : 09/394474 |
| DATED | : September 10, 2002 |
| INVENTOR(S) | : Rickie J. Wright |

It is certified that error appears in the above-identified patent and that said Letters Patent is hereby corrected as shown below:

On title page Inventor item [75]

The name of the inventive entity delete Rickie J. Wright and Wade Waterman insert Rickie J. Wright, alone, pursuant to Court Order, as attached.

Signed and Sealed this

Twenty-sixth Day of June, 2007

JON W. DUDAS
*Director of the United States Patent and Trademark Office*